United States Patent [19]

Fedoroff et al.

[11] Patent Number: 5,295,215
[45] Date of Patent: Mar. 15, 1994

[54] OPTICAL CABLE

[75] Inventors: Michael S. Fedoroff; Johannes I. Greveling, both of Saskatoon, Canada

[73] Assignee: Northern Telecom Limited, Montreal, Canada

[21] Appl. No.: 38,319

[22] Filed: Mar. 25, 1993

[51] Int. Cl.$^5$ .............................................. G02B 6/36
[52] U.S. Cl. ............................................................ 385/109
[58] Field of Search ............... 385/100, 107, 109, 110, 385/111, 112, 113; 57/5, 14, 6, 1 R; 523/173

[56] References Cited

U.S. PATENT DOCUMENTS

| | | | |
|---|---|---|---|
| 4,701,015 | 10/1987 | Saito et al. | 385/109 |
| 4,701,016 | 10/1987 | Gartside, III et al. | 385/109 X |
| 5,109,457 | 4/1992 | Panuska et al. | 385/109 X |
| 5,157,752 | 10/1992 | Greveling et al. | 385/109 X |
| 5,243,675 | 9/1993 | Kathiresan et al. | 385/109 |

Primary Examiner—Akm E. Ullah
Attorney, Agent, or Firm—R. J. Austin

[57] ABSTRACT

An optical cable with a loosely contained optical fiber which is inside a weak walled sheath together with water swellable powder. The sheath is surrounded by grease or gel. If the powder contacts water within the sheath, it expands, splits the sheath, and displaces the grease into the sheath to surround the fiber. Hence although grease is employed immediately around the fiber as a water block, under installation procedures the fiber surface is not contaminated with grease.

6 Claims, 1 Drawing Sheet

OPTICAL CABLE

BACKGROUND OF THE INVENTION a) Field of the Invention

This invention relates to optical cable.

b) Prior Art

Conventional optical cables have optical fibers extending along passages within which, generally, the fibers have freedom for lateral movement. In such cables there is a requirement for steps to be taken to avoid damage caused by water penetration. Fiber subjected to contact by water is known to experience a degradation in strength which, because of improvements in fiber coating techniques, is not of serious practical concern. However, there is a problem with customer perception of this type of situation in that it is believed that water degradation of fibers is a reason for concern. Further, there is the possibility that water inside a cable will freeze. The expanding ice will then compress individual fibers resulting in signal attenuation and fiber breakage.

In order to prevent water penetration along cables, it is known to use a water blocking grease or gel which surrounds the optical fibers. Unfortunately, this water blocking material is an irritant to water blocking installers who need to clean the grease or gel from the fibers before they may be handled or spliced. Grease or gel make it difficult and unpleasant to handle the fibers during installation or repair of a cable and low temperature (e.g. below 0° C.) change in viscosity of the grease or gel surrounding and contacting fibers may increase signal attenuation in the fibers. One method of eliminating the need for grease or gel in contact with optical fibers while still providing a water blocking function involves the use of a replacement water blocking material which is swellable upon contact with water so as to fill and water block any passageway within which it is disposed. A commonly referred to material having this function is polyacrylate which is normally used in particulate form. In one disclosure, U.S. Pat. No. 5,157,752 a swellable water blocking means is used which comprises an elongate element which swells upon contact with water. This elongate element is disposed within a passageway of the cable together with the optical fibers so that upon contact with water the elongate element swells to block the passageway. In the examples given in this previous patent, the elongate element comprises a carrier which may be of filamentary structure, e.g. a string, or a tape which may be of open construction and the string or tape actually carries the particulate polyacrylate material. Alternatively, no particulate material is used and the elongate member comprises polyacrylate filaments spun with other filaments e.g. polyester or nylon to form a string.

The problem which is found with water swellable materials as the use of a water block is that such materials allow water to remain in the presence of the optical fibers and the degradation problems referred to above may still be found with this type of arrangement. It is also of concern that this standing water may freeze thus resulting in the breakage and signal attenuation problems referred to above. It follows from this therefore that the use of grease or gel as a water blocking material may still be preferred over water swellable water blocking materials even though the disadvantage of needing to clean the fiber of the grease or gel still remains.

SUMMARY OF THE INVENTION

The present invention provides an optical cable which incorporates water blocking grease or gel material for providing a water blocking function directly around optical fibers while minimizing the optical fiber cleaning problem.

Accordingly, the present invention provides an optical cable formed with a longitudinally extending passage and an optical fiber unit loosely located within and extending along the passage; the optical fiber unit comprising at least one optical fiber loosely contained within a weak walled and flexible tubular member and a water blocking means also disposed within the weak walled and flexible tubular member, the water blocking means being swellable upon contact with water and of a quantity sufficient during swelling to pressurize and split the weak walled and flexible tubular member; and the passage containing a water blocking grease or gel material surrounding the optical fiber unit, the water blocking gel or grease material being of a sufficient amount to become pressurized as a result of swelling of the swellable water blocking means so as to be forced into the split weak walled and flexible tubular member and into surrounding contact with the fiber.

Thus, with an optical cable according to the invention, upon the swellable water blocking material swelling in the presence of water and splitting the weak walled and flexible tubular member, the swelling of the water blocking means displaces the grease or gel surrounding the optical fiber unit so that the grease or gel is forced through the split and into contact with the fiber. With this arrangement, the presence of the grease or gel in contact with the fiber prevents or minimizes the contact of the fiber by the water. As a result of the movement of the water swellable material and of the grease or gel, it has been found that water is dispersed into discrete locations whereby only localized ice crystals may form. This minimizes the possibility of the fiber being completely surrounded by any quantity of water which could result in compression and degradation or breakage of the fiber. In addition, because the fiber under normal dry conditions is not contacted by the grease or gel, it is easier for a cable installer to expose the bare fibers and to splice them as required while the grease or gel is held separate from the fibers because of the flexible tubular member.

BRIEF DESCRIPTION OF THE DRAWINGS

One embodiment of the invention will now be described, by way of example, with reference to the accompanying drawings, in which.

DESCRIPTION OF THE EMBODIMENT

Figure 1:
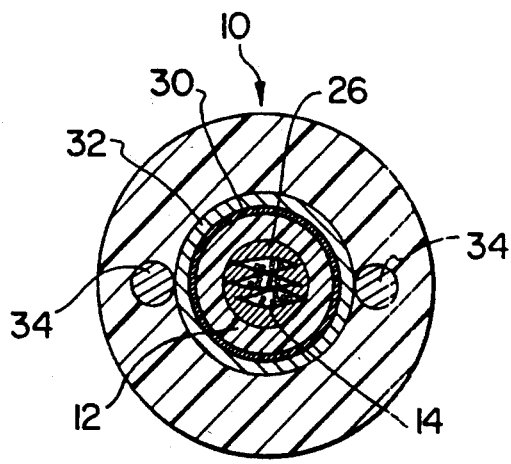
FIG. 1 is a cross-sectional view through an optical cable according to the embodiment.
Figure 2:
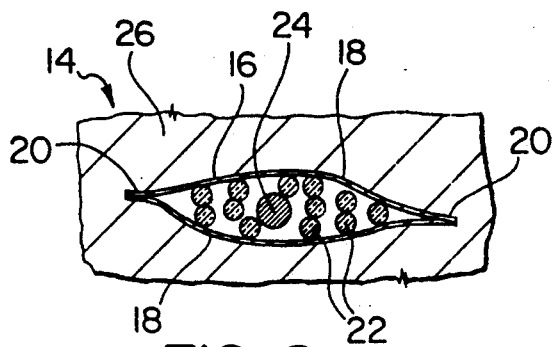
FIG. 2 is a view similar to FIG. 1 of part of the cable of the embodiment and to an enlarged scale.

As shown by FIG. 1, in the embodiment, an optical cable 10 comprises a central tube 12 formed from a suitable plastics material, e.g. polybutyleneterathalate or polyethylene which may be high density polyethylene. Within the tube 12, are disposed a plurality, namely three, optical fiber units 14 which extend along the tube passage. Each optical fiber unit comprises a flexible tubular member 16 as shown by FIG. 2, the flexible tubular member formed by two plastic strips 18 which oppose each other and are bonded together along longitudinally extending edge regions 20 to provide two longitudinally extending seams. Each tubular member 16 in a normal undistorted condition has a major axis and a minor axis normal to the major axis and the bonded together edge regions lie substantially on the major axis. The plastic strips 18 are weak walled for a reason to be described and have a maximum thickness of 5 mil with a preferred thickness of 2 mil. Disposed within each of the tubular members 16 together are a plurality of optical fibers 22 and a swellable water blocking means. The swellable water blocking means comprises at least one elongate element 24 such as is shown in FIG. 2, the elongate element formed from a carrier material of filamentary structure, e.g. a string or a tape which may be of open construction (e.g. woven) so as to allow for water to flow through the tape. The carrier material carries a particulate water swellable material, i.e. polyacrylate particles. Alternatively, the elongate element 24 comprises acrylate filaments spun along with polyester, nylon or other filaments to form a string.

Surrounding the optical fiber units 14 and within the tube 12 there is provided a water blocking grease or gel material 26. It is important that the grease or gel 26 is in large quantities for reasons to be described and for this purpose the quantity of the grease or gel is such that the weak walled tubular members 16 are collapsed inwardly so as to reduce the internal volume of each of the tubular members around the fibers 22 and the elongate element 24. Surrounding the tube 12 is an annular layer 30 of water swellable compound, i.e. polyacrylate powder carried upon a carrier tape, and a coated metal shield 32. The shield 32 is a jacket 34 of material suitable for the particular purpose, e.g. polyethylene, and the jacket houses two diametrically opposed tensile strength members 34 which extend longitudinally of the cable parallel to the cable axis. The strength members may be of any suitable material for providing the required tensile strength and in this particular case they are formed from carbon steel.

In use of the cable 10, it is found that because the tubular members 16 separate the optical fibers from the grease or gel 26, the problems associated with the presence of the grease or gel during splicing of the cable are largely eliminated. While, of course, the gel still exists within the tube 12, the splicer or cable installer may easily avoid contact of the grease with the optical fibers 22 which may easily be spliced to other optical fibers as required.

Figure 3:
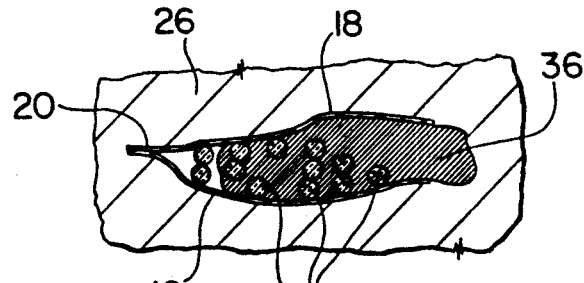
FIGS. 3 and 4 are views similar to FIG. 2 showing two separate stages in the action of water blocking materials within the cable in the presence of water.
Figure 4:
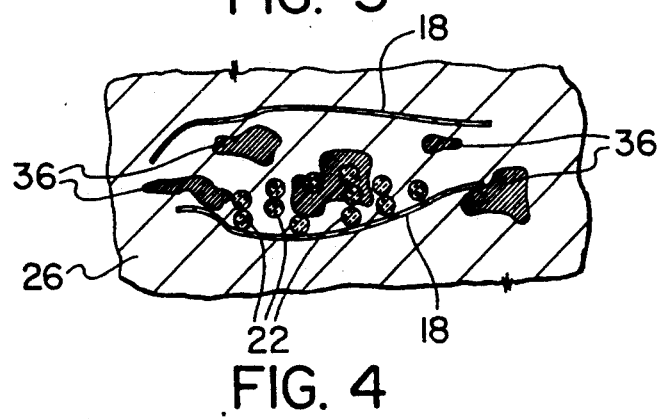

Should water penetrate into the cable and into the tube passage, no particular problem exists for the optical fibers unless the water penetrates through a tubular member 16. Upon such an occurrence, then upon contact of the elongate member 24 by water in any particular location, the water swellable material immediately swells so as to fill the inside of the tubular member. The amount of the swellable material within each tubular member 16 must be such that it will fill the tubular member sufficiently to cause it to split under sustained pressure from within. To this end each tubular member is sufficiently thin, as indicated above, to make it weak walled and ensure that such splitting will take place. Upon a tubular member splitting because of internal pressure, this allows the swelling material of the elongate member 24 to swell outwardly through the split in the tubular member such as is indicated for the mass of swelling material at reference 36 in FIG. 3. As indicated, the quantity of grease or gel within the tube 12 is maximized and upon swelling of the swellable material of the elongate member 24 and resultant outward expansion of the tubular member 16, the grease or gel is placed under compression. This compression is maintained and even increased as the tubular member is being split and upon the mass 36 of swelling material expanding outwardly from within the tubular member (FIG. 2), the grease or gel becomes displaced within the tube 12. It is found that this displacement of the grease or gel results in it being forced to interchange positions to a large degree with the mass 36 of swelling material. As a result, the grease or gel is transferred into the split tubular member 16 so as to contact and at least partly surround the optical fibers as shown by FIG. 3. As shown in this figure, the mass 36 of swelling material eventually becomes segregated into small discrete regions 38 some of which lie within the tubular member 16 and some outside of the member. In a majority of cases these small discrete regions 38 do not completely surround any particular optical fiber 22. Instead, most, if not all optical fibers are at least partly surrounded by the grease or gel 26 which is lying within the tubular member (FIG. 4).

As may be seen therefore from the above description, upon water penetration within any of the tubular members 16, water swellable material of the elongate member 24 has a water swelling reaction and operates in such a way as to ensure that optical fibers become at least partly surrounded by the grease or gel so that deleterious effects of the water upon the optical fibers are minimized. Hence, any possibility of degradation of the optical fibers because of contact with water is minimized and also the chances of resultant ice compression of the fibers is minimized together with any resultant signal attenuation or fiber break. These water blocking results with the use or grease or gel are obtainable even though the cable construction is such that under normal circumstances without water penetration, the optical fibers remain free from grease or gel and are easily reached by cable installers or splicers for cable installation or servicing.

What is claimed is:

1. An optical cable formed with a longitudinally extending passage and an optical fiber unit loosely located within and extending along the passage;

the optical fiber unit comprising at least one optical fiber loosely contained within a flexible tubular member which is capable of being split under internal pressure and a swellable water blocking means also disposed within the flexible tubular member, the swellable water blocking means operable upon swelling to pressurize and split the flexible tubular member;

and the passage containing a water blocking grease or gel material surrounding the optical fiber unit, the water blocking grease or gel material being pressurized upon swelling of the swellable water blocking means so as to be forced into the split flexible tubular member and into surrounding contact with the fiber.

2. An optical cable according to claim 1 wherein the flexible tubular member is collapsed inwardly to reduce its internal volume, by the grease or el surrounding the optical fiber unit.

3. An optical cable according to claim 1 wherein the flexible tubular member is formed from a plastic strip means having at least one longitudinally extending seam provided by bonded together longitudinally extending edge regions of the strip means.

4. An optical cable according to claim 3 wherein the tubular member in cross-section has a major axis and a minor axis normal to the major axis and the seam is provided substantially on the major axis.

5. An optical cable according to claim 1 wherein the swellable water blocking means comprises at least one elongate member which extends longitudinally of the tubular member and which swells upon contact with water.

6. An optical cable according to claim 5 including a plurality of optical fibers within the tubular member and the at least one elongate member extends longitudinally of the tubular member together with the fibers.

* * * * *